United States Patent Office.

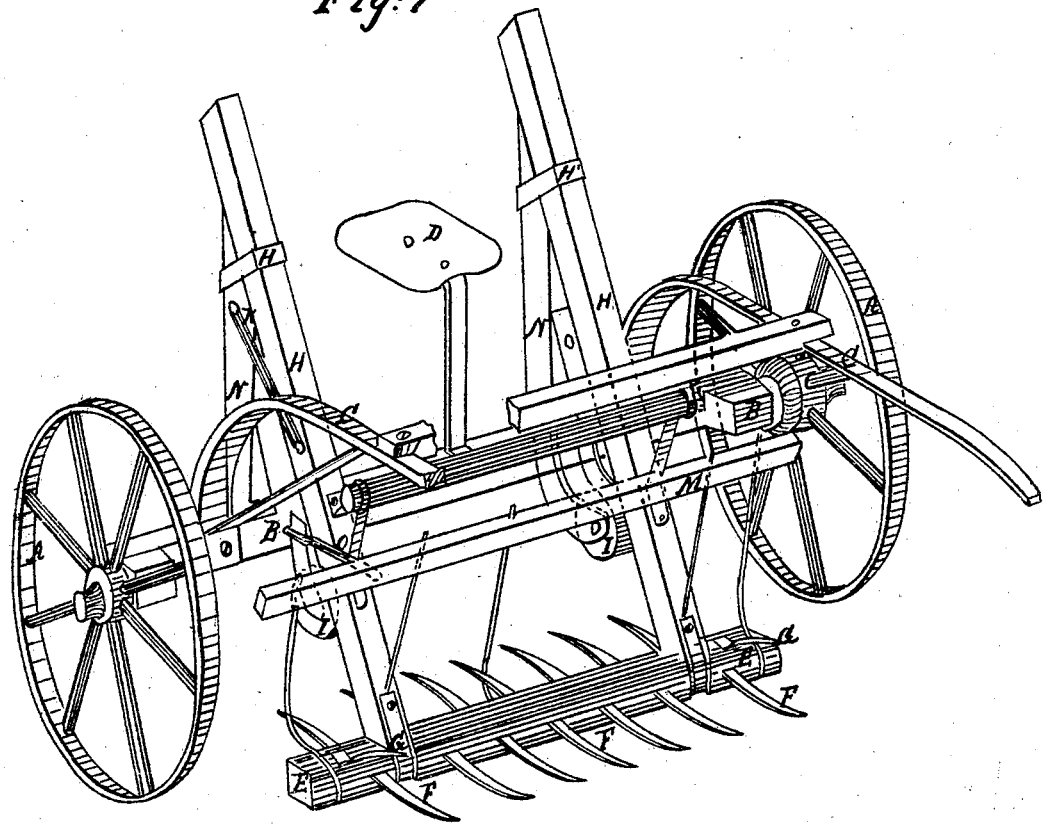

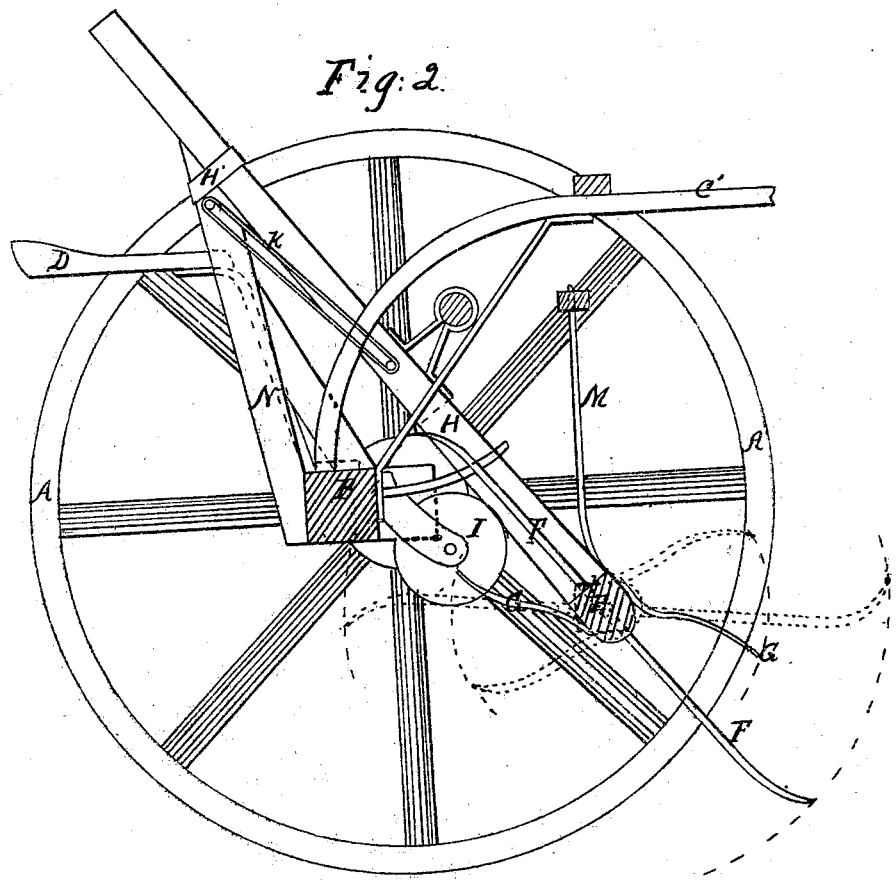

DANIEL PREST, OF MARLBORO', NEW JERSEY.

*Letters Patent No. 67,673, dated August 13, 1867.*

---

IMPROVEMENT IN HORSE-RAKES.

---

*The Schedule referred to in these Letters Patent and making part of the same.*

---

TO ALL WHOM IT MAY CONCERN:

Be it known that I, DANIEL PREST, of Marlboro', in the county of Monmouth, and State of New Jersey, have invented a new and useful Improvement in Horse Hay-Rakes; and I do hereby declare that the following is a full, clear, and exact description of the same, reference being had to the annexed drawings, making part of this specification, in which—

Figure 1 is a perspective view, and

Figure 2 is a central vertical longitudinal section.

In both figures the same letters are employed in the indication of identical parts.

My invention is applied to that class of horse-rakes which are carried upon wheels, and on which the driver rides, and it consists in so suspending the revolving rake upon sliding beams, that it may be brought into action by pressing it downwards by the feet of the driver, and raised by springs on being relieved from pressure, so as to permit the revolution of the rake or allow it to be carried above the ground, as desired.

A A are the wheels, turning upon the rigid axle B, to which the draught is applied through the braces C. D is the driver's seat, resting upon the axle. The revolving rake-head E has two opposite sets of teeth F made to gather the cut grass. The spurs G are also attached to the rake-head, and, together with the brace connecting with the cross-piece M, hold the hay as it is gathered upon the teeth. The rake-head is attached, by straps, to the ends of the beams H, in such manner that it may revolve. These beams rise over the axle, resting upon friction-wheels I, and passing through the straps H' attached to vertical braces N raised upon the axle. Rods O projecting from the axle prevent any lateral motion in the beams. The India-rubber elastic straps K, attached to the braces N, and the beams K, draw the beams upwards, and should have a tension sufficient to sustain the weight of the beams and rake, and carry the rake raised above the ground when not in use. Instead of this form of spring any other form may be substituted, as elliptic or other steel spring, coiled springs, &c., &c. The foot-piece L is placed in front of the beams H, at convenient distance from the driver's seat, so as to allow him to press it with his feet.

The action of my improved hay-rake is as follows: When it is desired to commence raking, the driver presses his foot on the foot-piece L and forces down the sliding beams H and rake thereto attached. When the rake is loaded, reaching a windrow, the driver removes his feet from the foot-piece L, and the tension of the spring raises the beam H and rake-head E; the weight of the hay on the teeth causes the rake to revolve, turning over the hay carried upon the teeth; the driver again presses the rake down, and the opposite set of teeth are brought immediately into action.

It is obvious that the same principle may be applied, by renewing the action of the springs so as to draw down the rake, which can be raised by the driver, though the mode stated is believed to be the more convenient.

What I claim as my invention, and desire to secure by Letters Patent, is—

1. So suspending a revolving rake from the axle B, by sliding beams H, that it may be brought into action by pressure applied directly to the beams, and raised automatically, on being relieved from pressure, by springs, which hold it suspended above the cut grass, substantially as set forth.

2. The combination of the revolving rake-head E, sliding beams H, springs K, and foot-piece L, substantially as and for the purpose set forth.

In testimony whereof I have signed my name to this specification in the presence of two subscribing witnesses.

DANIEL PREST.

Witnesses:
D. P. HOLLOWAY,
C. F. CLAUSEN.